C. C. ZENK.
METHOD FOR MAKING COMMUTATORS.
APPLICATION FILED SEPT. 5, 1912.
1,360,165.
Patented Nov. 23, 1920.
2 SHEETS—SHEET 1.
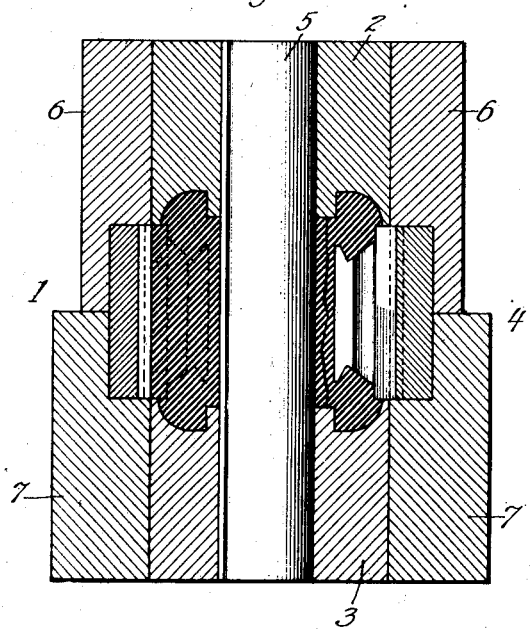
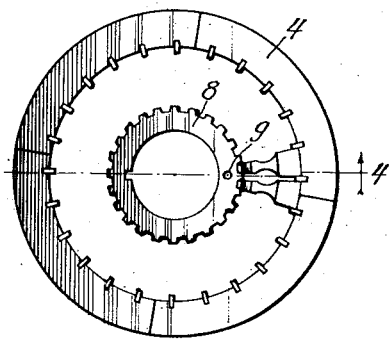
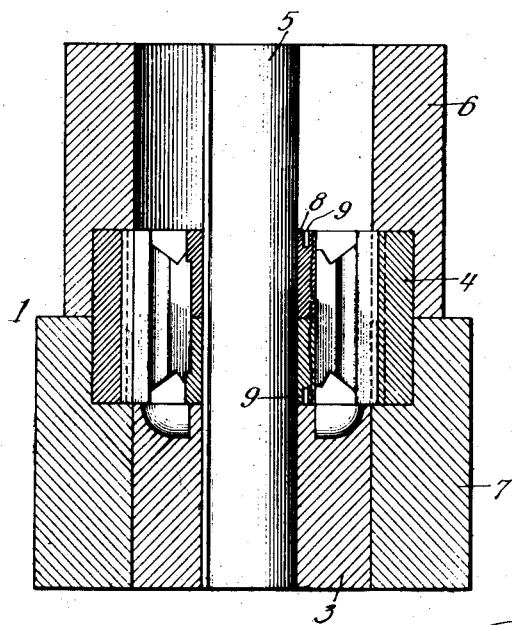
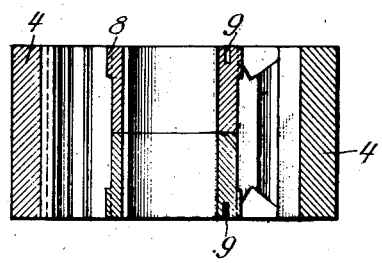
Inventor.
Charles C. Zenk.
By ⸺ B. A. Tower
atty.

C. C. ZENK.
METHOD FOR MAKING COMMUTATORS.
APPLICATION FILED SEPT. 5, 1912.

1,360,165.

Patented Nov. 23, 1920.
2 SHEETS—SHEET 2.

Inventor
Charles C. Zenk
By Edwin B. H. Tower Jr.
Atty.

UNITED STATES PATENT OFFICE.

CHARLES C. ZENK, OF WILKINSBURG, PENNSYLVANIA, ASSIGNOR TO DIEHL MANUFACTURING COMPANY, OF ELIZABETH, NEW JERSEY, A CORPORATION OF NEW JERSEY.

METHOD FOR MAKING COMMUTATORS.

1,360,165. Specification of Letters Patent. Patented Nov. 23, 1920.

Original application filed July 8, 1912, Serial No. 708,244. Divided and this application filed September 5, 1912. Serial No. 718,778.

*To all whom it may concern:*

Be it known that I, CHARLES C. ZENK, a citizen of the United States of America, residing at Wilkinsburg, in the county of Allegheny and State of Pennsylvania, have invented certain new and useful Improvements in Methods for Making Commutators, of which the following is a specification, reference being had therein to the accompanying drawing.

This invention relates to a method for making commutators.

This application is a division of application Serial No. 708,244, filed July 8, 1912, Patent No. 1,255,681, February 5, 1918, which claims particularly a molded commutator produced under the invention set forth herein.

The ordinary commutator employed in practice for electric motors and generators has its bars held in position by means of clamping rings drawn together by bolts or other means.

The object of this invention is to provide a method by which the commutator bars and a plastic insulating material may be pressed together and the insulating material solidified to form a commercial commutator in which the bars are firmly held in a definite position by the solidified insulating material.

In accordance with this invention as it has been practised, commutator bars and plastic material,—for instance bakelite,—are set together; then the bakelite is compressed and the bars and bakelite forced and pressed together into intimate contact with each other to form the commutator, and finally the bakelite is solidified under heat and pressure applied simultaneously.

The commutator as a whole is thus pressed and molded into shape under pressure and in consequence an accurate structure is obtained in which the bars are definitely positioned and firmly held in place.

Inasmuch as the bakelite is kept under pressure while it is being heated and solidified, it becomes a definitely shaped compact mass.

Of course, instead of bakelite, other plastic or moldable insulating material, preferably a phenol condensation product, which will harden under heat and pressure, may be employed.

A mold in which the method or process may be performed and the commutator molded is illustrated in the accompanying drawings.

Of course, the mold may assume other forms and be adapted to produce various commutators.

The views in the drawings are as follows:

Figure 1 is a vertical section through the mold with a commutator molded therein.

Fig. 2 is a vertical section through the mold with simply the commutator bars therein and the upper plunger removed.

Fig. 3 is a plan of the assembling ring and hub between which the bars may be assembled or set in position before being placed in the mold.

Fig. 4 is a vertical section on line 4—4 of Fig. 3.

Figure 5:
Fig. 5 is a perspective of a commutator bar for a cylindrical commutator.
Figure 7:
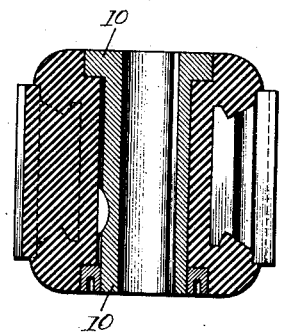
Fig. 7 is a central vertical section through a finished commutator.
Figure 6:
Fig. 6 is an end elevation thereof.
Figure 8:
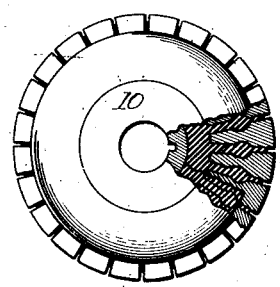
Fig. 8 is an end elevation, partly in cross-section, of a finished commutator.

The mold in general comprises a jacket or shell 1, plungers 2 and 3, an assembling ring 4, and a core 5.

The jacket has therein a compression chamber wherein the assembling ring is placed and the commutator pressed and molded. It is made in two sections, 6 and 7, which may be separated to admit access to the chamber and permit the assembling ring to be inserted and removed.

Each plunger slidably fits within its corresponding jacket section and has a central hole in which the core is slidably fitted.

When the jacket, the plungers and the core are in place, the compression chamber is entirely closed.

The plungers are independently removable from the jacket, and the core is removable from the plungers.

In order to facilitate placing the bars in position, they may be assembled within the assembling ring 4, and between the same and a hub 8, as illustrated in Figs. 3 and 4, before this ring is placed within the jacket.

This assembling ring and hub may each be provided with ribs to position the bars and space them apart.

The assembling ring may be divided axially into segmental sections to facilitate its removal after the commutator has been molded, and the hub may be divided transversely into two cylindrical sections to enable it to be removed before the bakelite is applied.

The hub may have each section provided with a threaded hole 9 to receive a tool for withdrawing it from the bars after they have been placed in the mold.

The course which may be followed in performing the method to produce a cylindrical commutator with the mold set forth herein is as follows:

1. The commutator bars set in position within the assembling ring, as shown in Figs. 3 and 4.
2. The assembling ring placed within the jacket, the lower plunger and core inserted as shown in Fig. 2, and the upper hub section removed.
3. Bakelite placed within the upper jacket section and the upper plunger inserted and then the mold reversed in position and the lower plunger and lower hub section removed.
4. Bakelite placed within the lower jacket section and the lower plunger inserted.
5. Finally, the plungers forced inwardly and the mold heated.

As a result the bars and bakelite are forced together and the bakelite compressed to mold and press the commutator; and then, while the pressure is still applied, the bakelite is hardened and solidified.

The pressure while the bakelite is being transformed keeps the bakelite and the bars in intimate contact and the bakelite in a compact mass and definite shape.

When the commutator has been molded, a metallic sleeve 10 may be inserted in the axial hole therethrough.

The sleeve may have at one end an integral flange and at the other end a removable flange screwthreaded thereto, which keep it in place.

Figure 9:
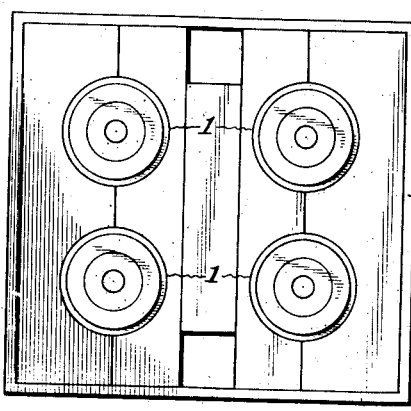
Fig. 9 is a plan of four molds to be operated together.

In order to mold a plurality of commutators at a time, a multiplicity of molds may be placed and clamped within a frame 11, as shown in Fig. 9, and operated simultaneously.

The mold set forth herein is to be made the subject of a divisional application.

Of course, as is manifest, various modified ways and means may be adopted to attain the ends sought by this invention, and the process may be applied to produce commutators of many forms.

Having thus described the invention, what is claimed is:

1. The method of making a commutator which consists in arranging commutator bars circumferentially in spaced relation, surrounding sides of said bars with insulating material having the property of hardening under the action of heat and pressure, and applying heat and pressure to harden said material into a solid body for insulating the bars and holding them together.

2. The method of making a commutator which consists in embedding commutator bars in a body of insulating material having the property of hardening under the action of heat and pressure, and applying heat and pressure to harden said material into a solid body for insulating said bars and holding them in position.

3. The method of making a commutator which consists in arranging commutator bars circumferentially in spaced relation, surrounding the inner ends of said bars with an insulating material having the property of hardening under the action of heat and pressure, and applying heat and pressure to harden said material into a body which insulates said bars and firmly holds them in position.

4. The method of making a commutator which consists in arranging commutator bars circumferentially in spaced relation, surrounding the inner ends and sides thereof and filling the spaces between the same with an insulating material having the property of hardening under the action of heat and pressure, and applying heat and pressure to harden said material into a body which insulates said bars and firmly holds them in position.

5. The method of making a commutator which consists in arranging commutator bars circumferentially in spaced relation, filling the interstices between the bars with insulating material having the property of hardening under the action of heat and pressure, and applying heat and pressure to harden said material to thereby insulate said bars and hold them together.

6. A method for making a commutator characterized by setting together commutator bars and a plastic material which will solidify under heat and pressure, compressing said material and forcing the bars and said material together to form the commutator, and finally solidifying said material under heat while pressure is maintained thereon.

7. A method for making a commutator characterized by setting commutator bars and a plastic material together, the bars being assembled into the required position, then compressing said material and forcing the bars and material into intimate contact, and finally solidifying said material under heat and pressure so as to keep the bars in position and said material in a compact mass and definite shape.

8. A method for making a commutator for dynamo electric machines characterized by setting commutator bars and a phenol condensation product together, compressing said product and forcing the bars and said product into intimate contact, and finally solidifying said product under heat and pressure simultaneously applied.

9. A method for making a commutator for dynamo electric machines characterized by assembling the commutator bars, applying thereto a phenol condensation product, compressing said product and forcing it into intimate contact with said bars, and finally transforming said product under heat and pressure to solidify the same.

In testimony whereof I affix my signature in the presence of two witnesses.

CHARLES C. ZENK.

Witnesses:
  KARL H. BUTLER,
  MAX H. SROLOVITZ.